US012802987B2

(12) United States Patent
Luo et al.

(10) Patent No.: US 12,802,987 B2
(45) Date of Patent: Nov. 17, 2026

(54) RECHARGEABLE POTASSIUM ION BATTERY

(71) Applicant: George Mason University, Fairfax, VA (US)

(72) Inventors: Chao Luo, Vienna, VA (US); Kaiqiang Qin, Fairfax, VA (US)

(73) Assignee: GEORGE MASON UNIVERSITY, Fairfax, VA (US)

(*) Notice: Subject to any disclaimer, the term of this patent is extended or adjusted under 35 U.S.C. 154(b) by 850 days.

(21) Appl. No.: 18/139,759

(22) Filed: Apr. 26, 2023

(65) Prior Publication Data

US 2024/0363865 A1 Oct. 31, 2024

Related U.S. Application Data

(60) Provisional application No. 63/336,262, filed on Apr. 28, 2022.

(51) Int. Cl.

| | |
|---|---|
| ***H01M 4/60*** | (2006.01) |
| ***H01M 4/62*** | (2006.01) |
| ***H01M 10/054*** | (2010.01) |

(52) U.S. Cl.

CPC ........... *H01M 4/606* (2013.01); *H01M 4/625* (2013.01); *H01M 10/054* (2013.01); *H01M 2300/0028* (2013.01)

(58) Field of Classification Search

CPC ......... H01M 10/0567; H01M 10/0568; H01M 4/60; H01M 4/606; H01M 4/625

See application file for complete search history.

(56) References Cited

U.S. PATENT DOCUMENTS

| | | | | |
|---|---|---|---|---|
| 10,593,992 | B2 * | 3/2020 | Komaba | H01M 10/054 |
| 2017/0077546 | A1 * | 3/2017 | Zhamu | H01M 4/587 |
| 2017/0207489 | A1 * | 7/2017 | Zhamu | H01M 4/13 |
| 2022/0384809 | A1 * | 12/2022 | Kim | H01M 4/136 |
| 2023/0036848 | A1 * | 2/2023 | Khan | H01M 10/36 |
| 2023/0178714 | A1 * | 6/2023 | Song | H01M 4/622 429/209 |

FOREIGN PATENT DOCUMENTS

| | | | | |
|---|---|---|---|---|
| CN | 118738388 A | * 10/2024 | | H01M 4/62 |
| JP | 2515547 B2 | * 7/1996 | | |
| JP | 2021163558 A | * 10/2021 | | |
| WO | WO-2021144050 A1 | * 7/2021 | | H01M 4/606 |
| WO | WO-2021256759 A1 | * 12/2021 | | H01M 10/0568 |
| WO | WO-2023074592 A1 | * 5/2023 | | H01M 10/0569 |

OTHER PUBLICATIONS

Machine translation of JP 2515547 (no date) (Year: 0000).*

Zhao et al, OxocarbonSalts for Fast Rechargeable Batteries, Agnewandte Chemie, 2016, 55, 12528-12532. (Year: 2016).*

(Continued)

*Primary Examiner* — Amanda C. Walke

(74) *Attorney, Agent, or Firm* — Ballard Spahr LLP

(57) ABSTRACT

Disclosed are rechargeable, organic, potassium ion batteries suitable for use at high temperatures and in a variety of applications that require thermally stable batteries (e.g., well drilling, electric vehicles, military applications, among others).

14 Claims, 18 Drawing Sheets

(56) References Cited

OTHER PUBLICATIONS

Gao, Hongcai, et al. "A High-Energy-Density Potassium Battery with a Polymer-Gel Electrolyte and a Polyaniline Cathode", Angewandte Chemie, 2018, 57, pp. 5449-5453.
Lei, Kaixiang et al. "High K-storage performance based on the synergy of dipotassium terephthalate and ether-based electrolytes", Royal Society of Chemistry, 2017, 10, pp. 552-557.
Liang, Yujia et al. "An Organic Anode for High Temperature Potassium-Ion Batteries", Advanced Energy Materials, 2019, 9, 1802986 (7 pages).
Lu, Xianlu, et al. "Robust high-temperature potassium-ion batteries enabled by carboxyl functional group energy storage", PNAS, 2021, vol. 118, No. 5 (6 pages).
Zhao, Qing et al. "Oxocarbon Salts for Fast Rechargeable Batteries", Angewandte Chemie, 2016, 55, pp. 12528-12532.

* cited by examiner

RECHARGEABLE POTASSIUM ION BATTERY

CROSS-REFERENCE TO RELATED APPLICATIONS

This application claims priority to U.S. Provisional Application No. 63/336,262, filed Apr. 28, 2022, which is incorporated into this application by reference.

STATEMENT REGARDING FEDERALLY SPONSORED RESEARCH AND DEVELOPMENT

This invention was made with government support under grant number 2142003 awarded by the National Science Foundation. The government has certain rights in the invention.

BACKGROUND

The substantial demands for the transition to a low-carbon economy have stimulated the development of sustainable batteries for portable electronics, electric vehicles, and grid-scale electrical energy storage. However, the state-of-the-art Li-ion batteries (LIBs), comprising transition metal-based inorganic electrode materials, cannot satisfy these demands because of the massive carbon dioxide emission from the material fabrication and battery production processes. To address this challenge, developing green and sustainable battery technologies beyond LIBs and exploiting new structures based on abundant and sustainable organic electrode materials (OEMs) are important objectives.

SUMMARY

In one embodiment, the battery comprises (a) a cathode material comprising a p-type organic compound or polymer; (b) an anode material comprising an n-type organic compound having at least one conjugated carbonyl; and (c) a liquid electrolyte comprising a potassium ion, wherein the liquid electrolyte has a boiling point of at least 100° C. The liquid electrolyte material can be disposed between the cathode and anode materials. The disclosed batteries can have improved capacity retention and life cycle relative to conventional batteries at temperatures or 25° C. and higher, including at temperatures as high as 60-80° C.

BRIEF DESCRIPTION OF THE DRAWINGS

The foregoing summary, as well as the following description of the disclosure, is better understood when read in conjunction with the appended drawings. For the purpose of illustrating the disclosure, the drawings illustrate some, but not all, alternative embodiments. This disclosure is not limited to the precise arrangements and instrumentalities shown. The following figures, which are incorporated into and constitute part of the specification, assist in explaining the principles of the disclosure.

DETAILED DESCRIPTION

Figure 1A:
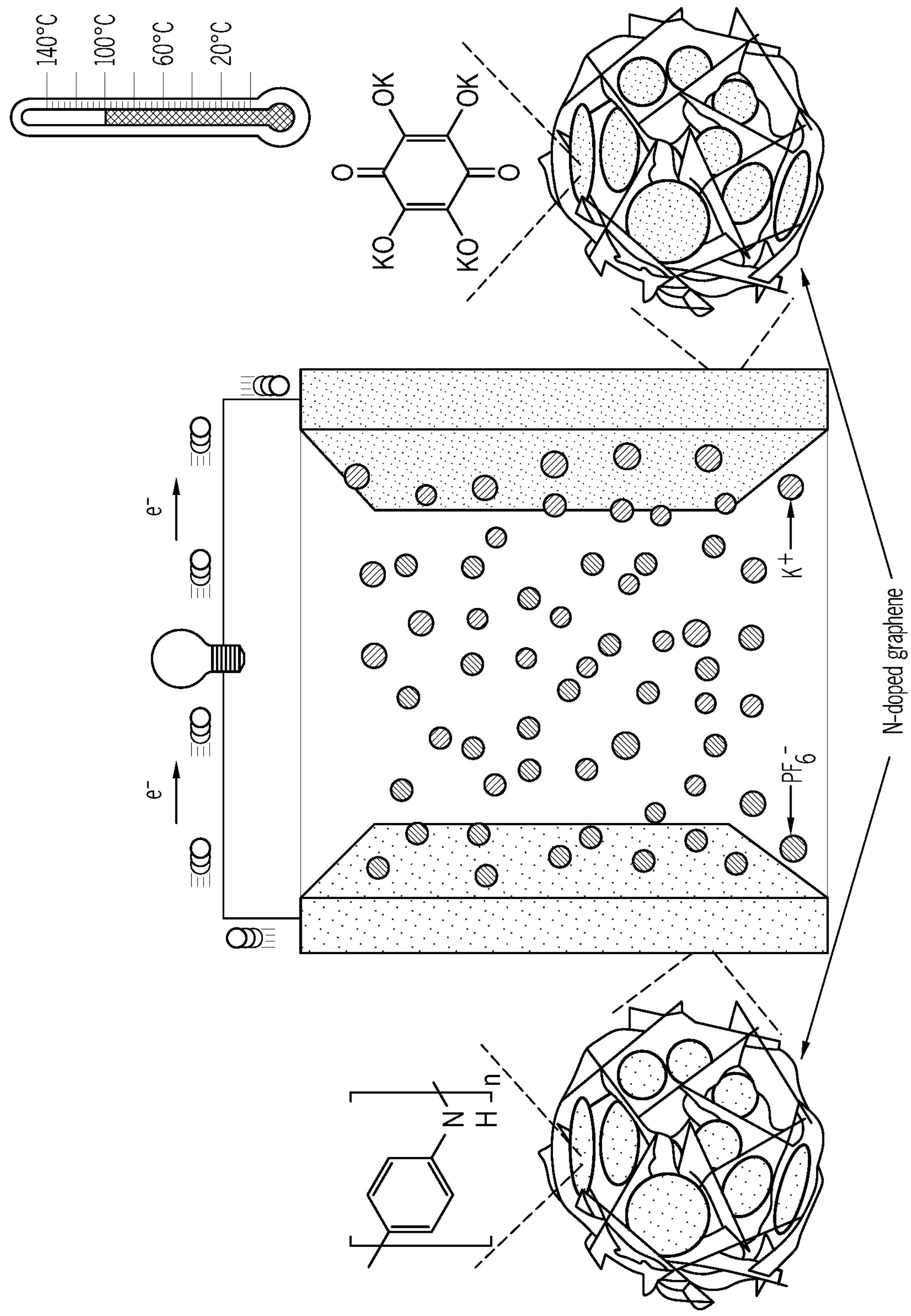
FIG. 1A is a schematic illustration of the all-organic rechargeable potassium dual-ion battery.

Among the emerging battery systems beyond LIBs, rechargeable potassium batteries (RPBs) stand out as promising alternatives due to their unique advantages as follows. (1) K resources (2.09% in the Earth's crust) are comparable to Na resources (2.36% in the Earth's crust), in terms of cost and abundance. Moreover, they are much more cost-effective and abundant than Li resources (0.0017% in the Earth's crust), making RPBs promising for sustainable batteries; (2) The redox potential of $K/K^+$ vs. the standard hydrogen electrode (SHE) is −2.93 V, which is close to that of $Li/Li^+$ (−3.04 V) and 220 mV lower than that of $Na/Na^+$ (−2.71 V), providing potentially high-voltage RPBs; (3) The ionic conductivity of K-ion electrolytes is higher than Li/Na-ion electrolytes due to the weakest Lewis acidity and smallest Stock radius of K-ions. Though the ionic radius of potassium (1.38 Å) is larger than lithium (0.76 Å), the Stock's radius of $K^+$ (3.6 Å) is smaller than that of $Li^+$ (4.8 Å) in propylene carbonate solvents, indicating much higher ion mobility and ion conductivity. As has been proved by computational chemistry, the diffusion coefficient of $K^+$ is approximately three times higher than that of $Li^+$, rendering RPBs promising for fast-charging batteries. Therefore, developing high-performance RPBs is pivotal for next-generation sustainable energy storage devices. The disclosed batteries address this need and others.

A. Battery Composition

In one embodiment, the battery comprises (a) a cathode material comprising a p-type organic compound or polymer; (b) an anode material comprising an n-type organic compound having at least one conjugated carbonyl; and (c) a liquid electrolyte comprising a potassium ion, wherein the liquid electrolyte has a boiling point of at least 100° C. The liquid electrolyte material can be disposed between the cathode and anode materials, with optional separators to the extent needed to prevent the cathode material from touching the anode material.

The n-type organic compound of the anode material can have at least one conjugated carbonyl, also known as an α,β-unsaturated carbonyl. In some embodiments, the n-type organic compound has four to twelve carbons. In other embodiments, the n-type organic compound has five to twelve carbons. In still other embodiments, the n-type organic compound has six to twelve carbons. In one embodiment, the n-type organic compound has six carbons.

In a further embodiment, the anode material comprises an n-type organic compound having the following structure (also known as tetrahydroxy-1,4-benzoquinone potassium salt, abbreviated TBPS).

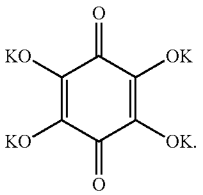

The TBPS can be prepared by neutralizing tetrahydroxy-1,4-benzoquinone with potassium hydroxide in an ethanol solution, for example.

As one of skill in the art will understand, the n-type organic compound of the anode material can be represented in the charged state (as shown in the charged TBPS example above) or the discharged state (as shown in the discharged TBPS example below):

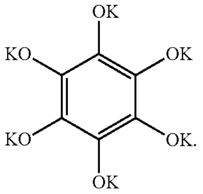

Figure 1B:
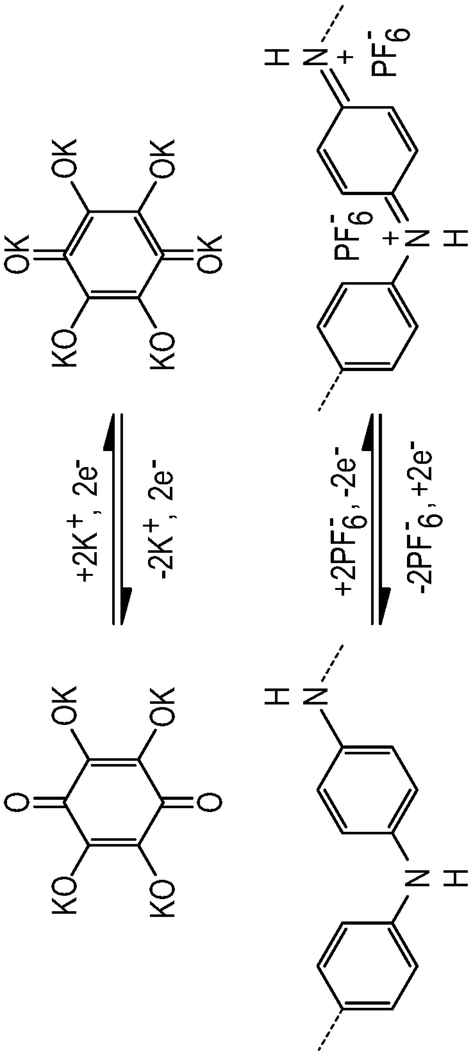
FIG. 1B is a scheme showing redox reactions in the organic anode and cathode during charge/discharge.

An exemplary reaction scheme showing representative charged and discharged states of the cathode and anode materials in response to redox reactions during a battery cycle is shown in FIG. 1B.

In some embodiments, the cathode material comprises a p-type organic polyamine. In general, any conjugated or aromatic polyamines are contemplated. Non-limiting examples include polypyrrole, polyaniline, cross-linked polyaniline, among others.

In one embodiment, the cathode material comprises a p-type organic polymer having the following structure:

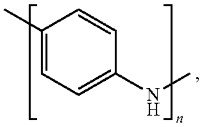

wherein n is an integer greater than one. The p-type organic polymer can in general have any suitable molecular weight (and by extension any suitable number of repeating units), e.g., 10,000-250,000 Daltons. In one embodiment, the polyaniline of the cathode material has a molecular weight ranging from about 10,000 to 250,000 Daltons, e.g., 50,000-200,000, 75,000-200,000, or 75,000-100,000 Daltons.

As with the n-type organic compound of the anode material, the p-type organic polymer of the cathode material can be represented in the discharged state (as shown in the discharged polyaniline example above) or in the charged state (for example as shown the charged polyaniline example depicted in FIG. 1*i*).

In some embodiments, either the cathode material, anode material, or both the cathode and anode materials further comprises a carbonaceous conductive material. The carbonaceous conductive material can increase conductivity, accommodate a large volume change, and help retain the structural integrity of the organic electrodes during repeated potassiation/de-potassiation cycles. Non-limiting examples of carbonaceous conductive materials include single-walled carbon nanotube, multi-walled carbon nanotubes, fullerene, graphite, graphene, graphene oxide, or any combination of these materials. In one specific embodiment, the carbonaceous conductive comprises nitrogen-doped graphene (abbreviated "NG").

In general, either the cathode material, anode material, or both the cathode and anode materials can be doped with a suitable carbonaceous conductive materials such that there is an excess of the p-type organic compound or polymer of the cathode material or an excess of the n-type organic compound of the anode material. In one embodiment, the ratio of the p-type organic compound or polymer to the carbonaceous conductive material ranges from 20:1 to 1:1. In another embodiment, the ratio of the n-type organic compound to the carbonaceous conductive material ranges from 20:1 to 1:1. In a further embodiment, in which both the cathode material and anode material comprises a carbonaceous conductive material, the ratio of the p-type organic compound or polymer (of the anode) and n-type organic compound (of the cathode) to the carbonaceous conductive material independently ranges from 20:1 to 1:1.

In some embodiments, the ratio of the p-type organic compound or polymer (of the anode) and/or n-type organic compound (of the cathode) to the carbonaceous conductive material independently ranges from 20:1 to 1:1, e.g., 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, or 1:1. In one specific embodiment, the ratio of the p-type organic compound or polymer to the carbonaceous conductive material is about 8:1. In another specific embodiment, the ratio of the n-type organic compound to the carbonaceous conductive material is about 8:1.

When the term "about" precedes a numerical value in this context and throughout this application, the numerical value can vary within +10% unless specified otherwise.

The liquid electrolyte generally comprises a potassium ion and has a boiling point of at least 100° C. In one embodiment, the liquid electrolyte has a boiling point of at least 110° C. In a further embodiment, the liquid electrolyte has a boiling point of at least 120° C. In a further embodiment, the liquid electrolyte has a boiling point of at least 130° C. In a further embodiment, the liquid electrolyte has a boiling point of at least 140° C. In a further embodiment, the liquid electrolyte has a boiling point of at least 150° C. In a further embodiment, the liquid electrolyte has a boiling point of at least 160° C. In a further embodiment, the liquid electrolyte has a boiling point ranging from 100° C. to 200° C. e.g., 100-190° C., 110-180° C., or 120-170° C.

In one embodiment, the liquid electrolyte comprises $KPF_6$. In a further embodiment, the liquid electrolyte comprises $KPF_6$ in diethylene glycol dimethyl ether (DEGDME). For example, 2.8 M $KPF_6$ in DEGDME has a boiling point of about 162° C. DEGDME also has a low volatility and assists in the formation of a stable $K_2CO_3$ and KF-rich solid electrolyte interface.

In one embodiment, the battery provides an alternative to lithium-ion batteries, and thus the liquid electrolyte can be lithium free. Similarly, the cathode material and/or the anode material can be lithium free. In further embodiments, the battery is an all organic battery, and thus the cathode material, the anode material, and the liquid electrolyte can be free of any transition metal. It will be understood, however, that the anode and cathodes as a whole (beyond the described cathode and anode materials having the n- and p-type organics) can also include commonly used current collectors, which may include a transition metal, such as aluminum (a common cathode current collector) or copper (a common anode current collector). Aside from any current collectors, however, embodiments include instances in which the cathode material, anode material, and liquid electrolyte are free of any transition metal.

B. Battery Performance

The disclosed batteries have surprising performance with respect to capacity retention at higher temperatures as well as battery life cycle at ambient and elevated temperatures. In one embodiment, the battery has a capacity at a temperature of at least 60° C. that is at least 50% of the capacity exhibited by the battery at 25° C. In a further embodiment, the battery has a capacity at a temperature of at least 60° C. that is at least 60% of the capacity exhibited by the battery at 25° C. In a further embodiment, the battery has a capacity at a temperature of at least 60° C. that is at least 70% of the capacity exhibited by the battery at 25° C. In a further embodiment, the battery has a capacity at a temperature of at least 60° C. that is at least 80% of the capacity exhibited by the battery at 25° C.

In some embodiments, the battery is capable of completing at least 300 charge/discharge cycles at a temperature of at least 60° C. In other embodiments, the battery is capable of completing at least 400 charge/discharge cycles at a temperature of at least 60° C. In further embodiments, the battery is capable of completing at least 500 charge/discharge cycles at a temperature of at least 60° C. In a further embodiment, the battery has a capacity reduction of less than about 10% after 500 charge/discharge cycles at a temperature of at least 60° C., e.g., at 60° C.

In one specific embodiment, after 500 charge/discharge cycles, the battery maintains at least 70% of its initial capacity at 25° C. and at a current density of 200 mA/g. For example, in one embodiment, for a full cell using a high-mass-loading electrode, the initial capacity at 25° C. was found to be 157.7 mAh/g (at a current density of 200 mA/g). After 500 charge/discharge cycles, this cell maintained a capacity at 25° C. of 124.3 mAh/g (78% of the initial capacity). In a further embodiment, the battery maintains 80% of its initial capacity after 350 charge/discharge cycles (with temperature and current density being held constant at 25° C. and 200 mA/g, respectively).

In further embodiments, the battery has improved performance at higher temperatures. In one embodiment, after 300 charge/discharge cycles, the battery maintains at least 80% of its initial capacity at 80° C. and at a current density of 200 mA/g. For example, at 80° C., an initial capacity of an embodiment at a current density of 200 mA/g was found to be 131.8 mAh/g, and this embodiment maintained a capacity of 111.3 mAh/g after 300 cycles at 80° C. (84% of the initial capacity).

C. Examples

The following examples further illustrate this disclosure. The scope of the disclosure and claims is not limited by the scope of the following examples.

1. Materials and Methods

Tetrahydroxy-1,4-benzoquinone hydrate (TCI, >98%), PANI (Alfa Aesar, >98%), and N-doped graphene (ACS Material) were used as received. The TBPS was prepared as follows: tetrahydroxy-1,4-benzoquinone hydrate was dispersed in ethanol with potassium hydroxide in 5% excess. The solution was stirred at room temperature for 48 h, then the solution was filtered to collect the precipitate. The precipitate was washed with ethanol and dried in the vacuum oven at 90° C. overnight. The obtained TBPS powder was loaded in a 5 mL vial together with N-doped graphene with the mass ratio of 2:1 and two balls with a diameter of 0.2 inch. Then, ball milling at 2000 rpm for 10 min was performed to prepare the TBPS/NG powder using Spex SamplePrep 5120 Mini Mixer/Mill Grinder. Similarly, the PANI powder was stored in a vail together with N-doped graphene with the mass ratio of 2:1, then ball milling at 2000 rpm for 10 min was performed to prepare the PANI/NG powder.

X-ray diffraction (XRD) pattern was recorded by Rigaku MiniFlex using Cu Kα radiation; Fourier transform infrared spectroscopy (FTIR) was recorded by Agilent Cary 630 FTIR Spectrometer; Nuclear magnetic resonance (NMR) was recorded by Bruker Ascend 400. The morphologies of electrode materials were observed by SEM (JEOL JSM-IT500HR) and TEM (JEOL JEM-1400F); Raman spectroscopy was recorded by Horiba XploRA PLUS Raman microscope with a 532 nm laser. XPS measurements were carried out at a PHI 5000 VersaProbe II system (Physical Electronics) spectrometer, which is equipped with a hemispherical analyzer. The spectrometer is attached to the Ar glovebox and sample transfer was directly through it to avoid any contact of the samples with air and moisture. Monochromatic Al-Kα excitation (hv=1486.6 eV) was used at power of 25 W, additionally applying a low-energy electron charge neutralizer. The high-resolution spectrum of each element was collected with a pass energy of 23.25 eV in an analysis area of 100*100 μm. The binding energy scale was corrected based on the C1s peak from contaminations (C—C at 284.8 eV) or from the amorphous carbon (around 284.0 eV) as internal binding energy standard.

The TBPS/NG powder was mixed with carbon black and sodium alginate binder to form a slurry at the weight ratio of 80:10:10. The electrode was prepared by casting the slurry onto Al foil using a doctor blade and dried in a vacuum oven at 90° C. overnight to prepare the TBPS/NG anode. The slurry coated on Al foil was punched into circular electrodes with a mass loading of 1.8 mg $cm^{-2}$. The PANI/NG powder was mixed with carbon black and sodium alginate binder to form a slurry at the weight ratio of 80:10:10. The electrode was prepared by casting the slurry onto Al foil using a doctor blade and dried in a vacuum oven at 90° C. overnight to prepare the PANI/NG cathode. The slurry coated on Al foil was punched into circular electrodes with a mass loading of ~2.7 mg $cm^{-2}$. For the preparation of electrodes with high mass loading (6.5 mg $cm^{-2}$, based on the mass of TBPS, and 9.7 mg $cm^{-2}$, based on PANI), the TBPS/NG or PANI/NG powder was mixed with carbon black and polytetrafluoroethylene (PTFE) binder at the weight ratio of 80:10:10, a thick film was obtained directly after grinding for 20 min. The thick film was cut into small pieces, and each piece was pressed together with a stainless-steel mesh. The anode or cathode with high mass loading was obtained after drying in a vacuum oven at 90° C. overnight.

Coin cells (2032) for rechargeable potassium batteries were assembled using K metal as the counter electrode, a 2.8 M $KPF_6$ in Diethylene glycol dimethyl ether (DEGDME) electrolyte and glass fiber (Whatman) as the separator. To assemble the all-organic battery, TBPS/NG anode and PANI/NG cathode were activated under the current density of 100 mA $g^{-1}$ for 10 cycles using the half-cell system. After cycling, coin cells were opened in glovebox and re-assemble the all-organic battery using TBPS/NG as the anode and PANI/NG as the cathode. Electrochemical performance was tested using Landt battery test system. Cyclic voltammograms were recorded using Gamry Reference 1010E Potentiostat/Galvanostat/ZRA with a scan rate of 0.1-1 mV $s^{-1}$. Impedance analysis was also performed by Gamry Reference 1010E Potentiostat/Galvanostat/ZRA.

To do the XRD test before and after cycling at high temperatures, four all-organic batteries were assembled. After running for 20 cycles at 70° C., 80° C., 90° C., and 100° C. under the current density of 200 mA $g^{-1}$ and keep at 0.05V for 5 h, the coin cells were opened in the glovebox. The four electrodes were washed by DEGDME and dried in a vacuum oven at 90° C. overnight. Then, the four cycled electrodes and pristine electrode were directly tested by Rigaku MiniFlex.

2. Structure of TBPS

Figure 2A:
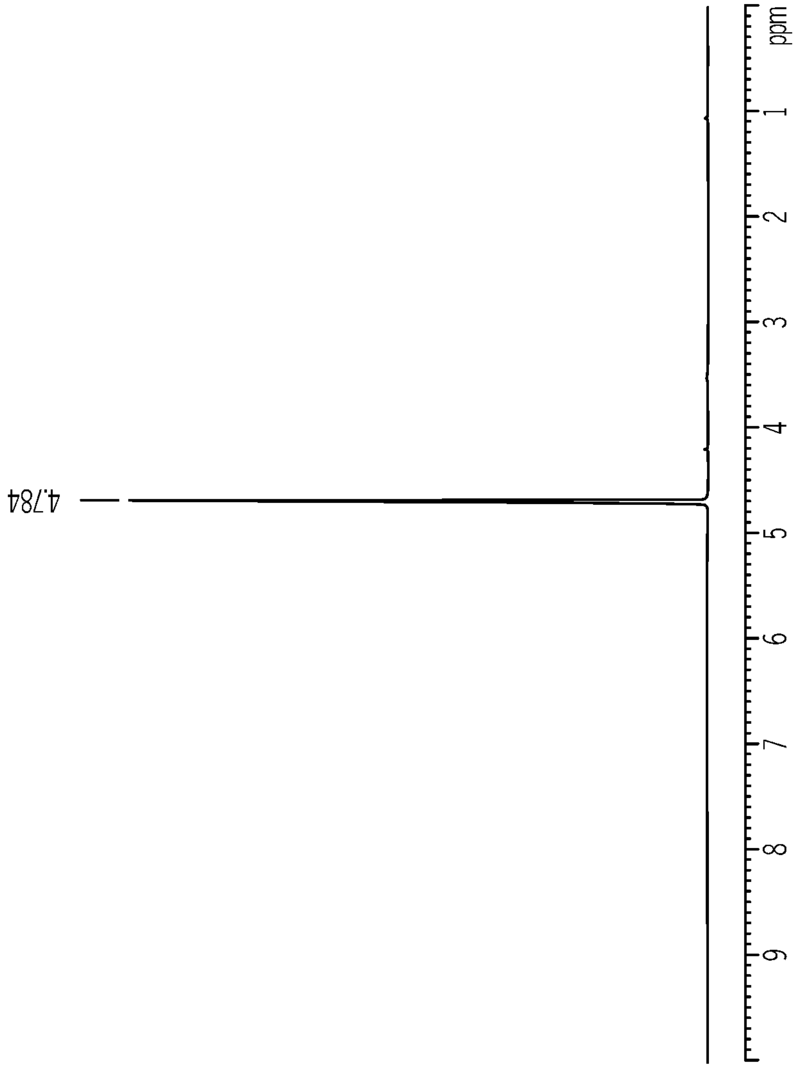
FIG. 2A is a representative $^{1}H$ NMR spectrum for the TBPS compound with $D_2O$ as the solvent.
Figure 2B:
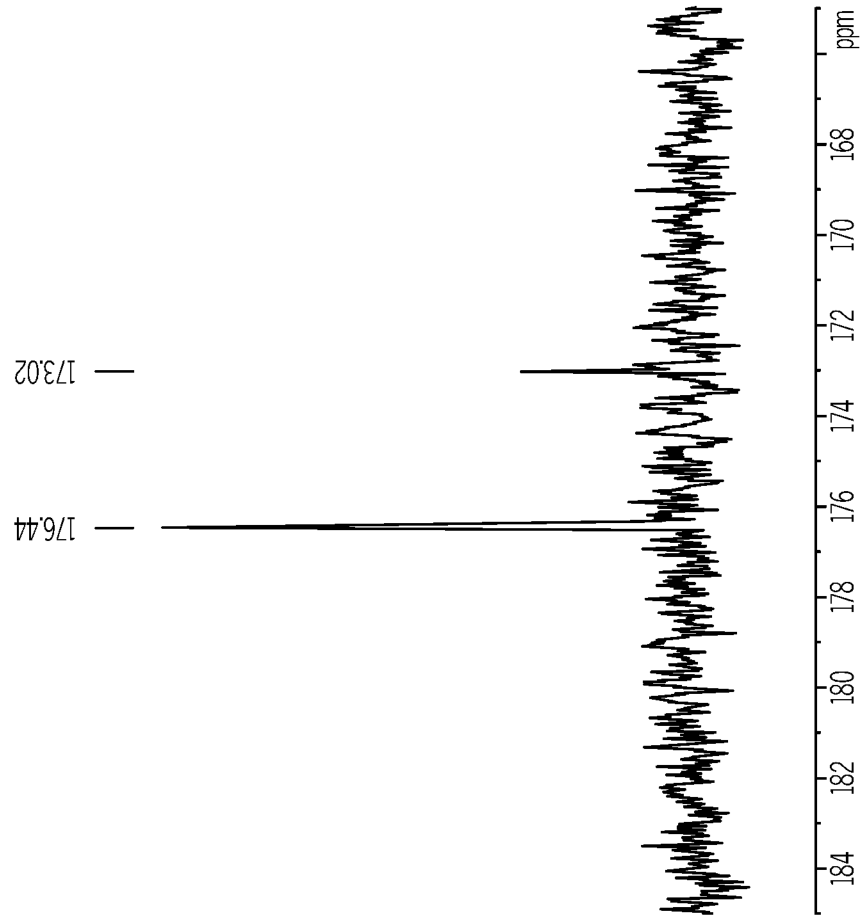
FIG. 2B is a representative $^{13}C$ NMR spectrum for the TBPS compound with $D_2O$ as the solvent.
Figure 3A:
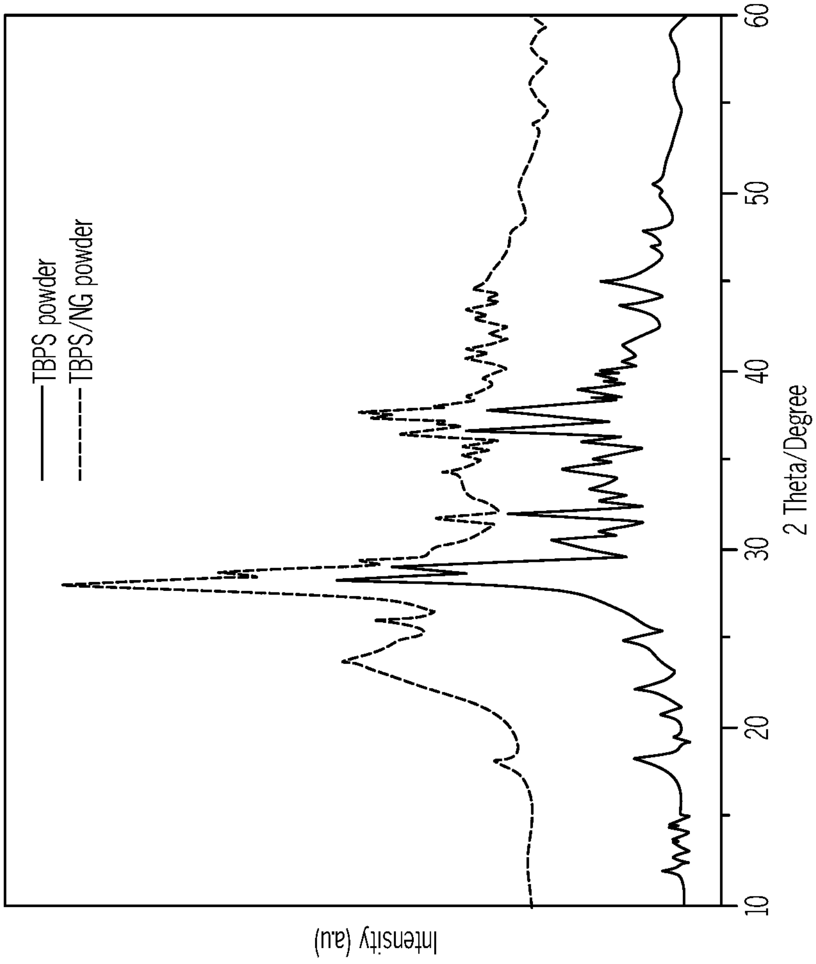
FIG. 3A is a representative XRD spectrum showing the XRD patterns for TBPS and TBPS/NG powders.
Figure 3B:
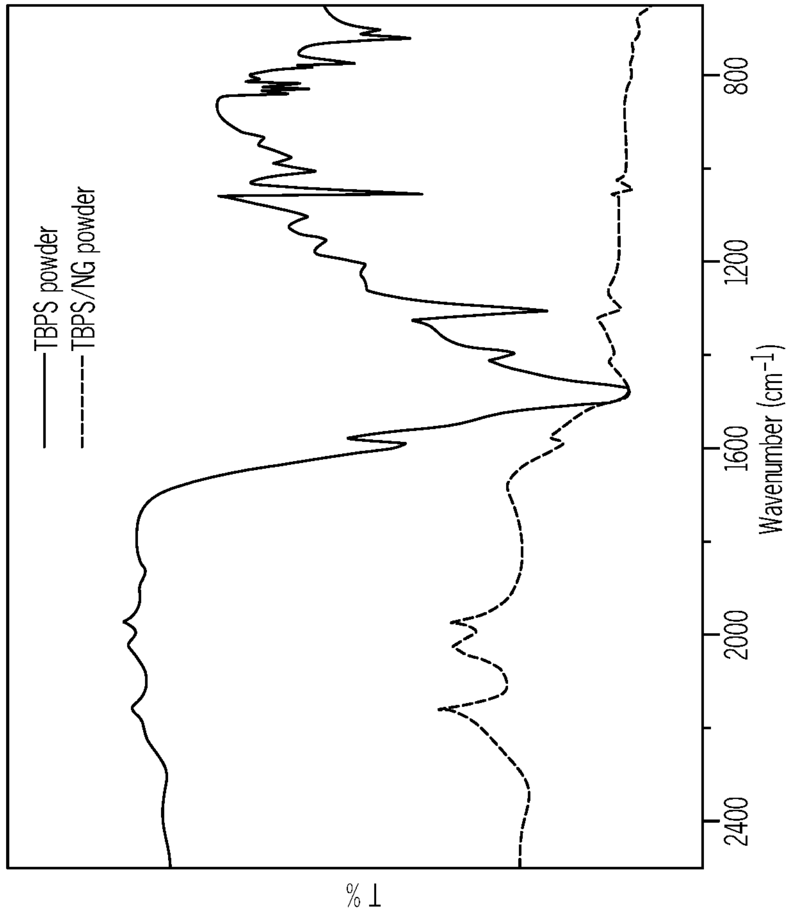
FIG. 3B is a representative FT-IR spectrum for TBPS and TBPS/NG powders.
Figure 3C:
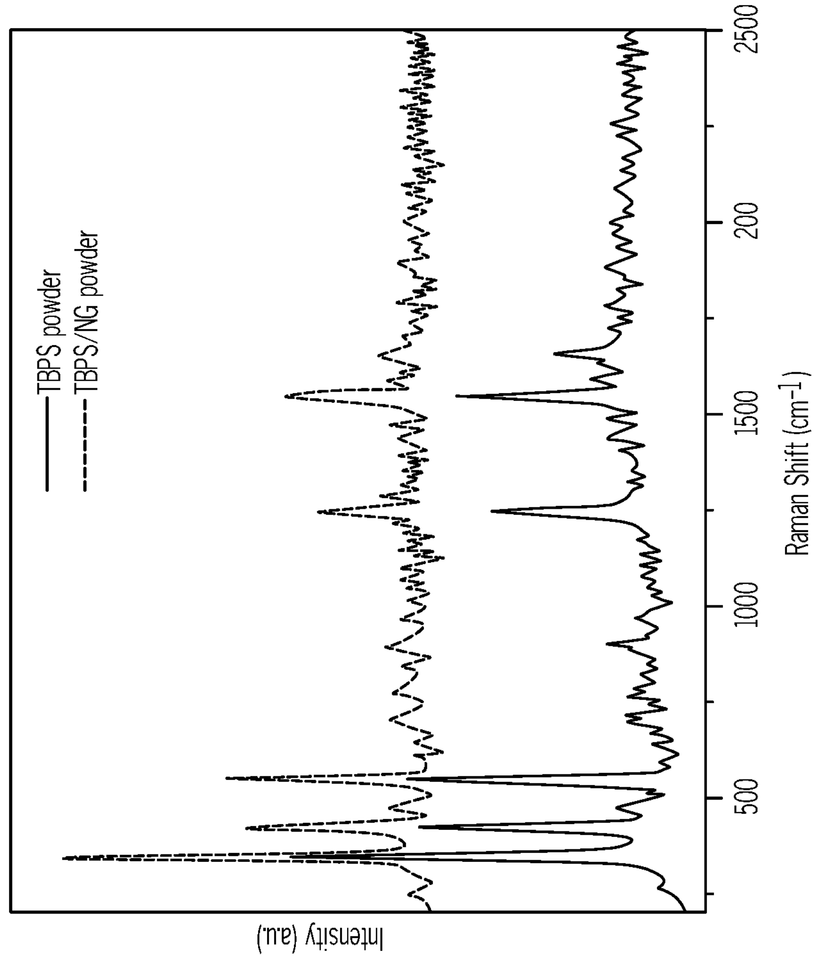
FIG. 3C is a representative Raman spectrum for TBPS and TBPS/NG powders.
Figure 3D:
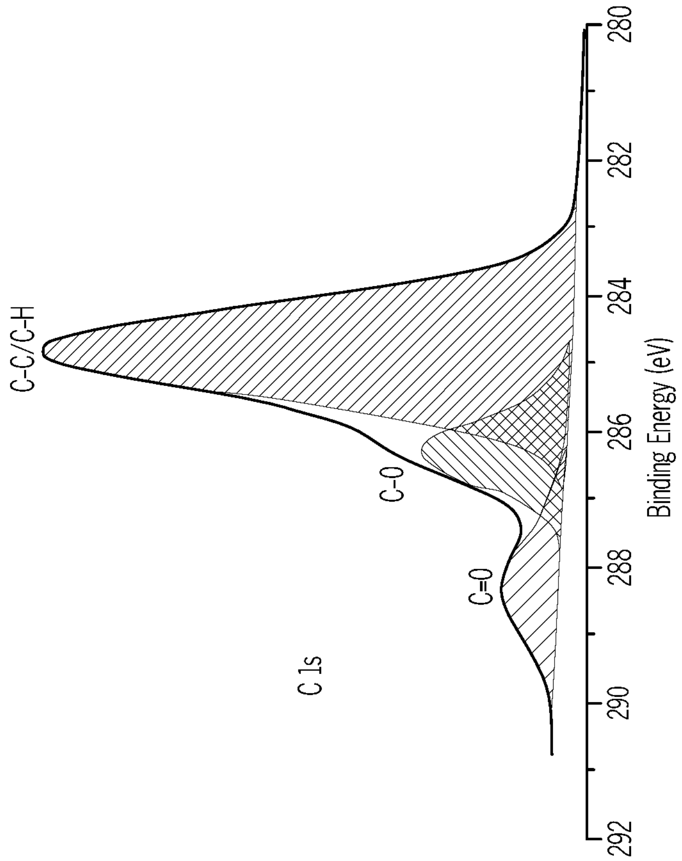
FIG. 3D is a representative XPS spectrum of the TBPS powder in the C 1s region.
Figure 3E:
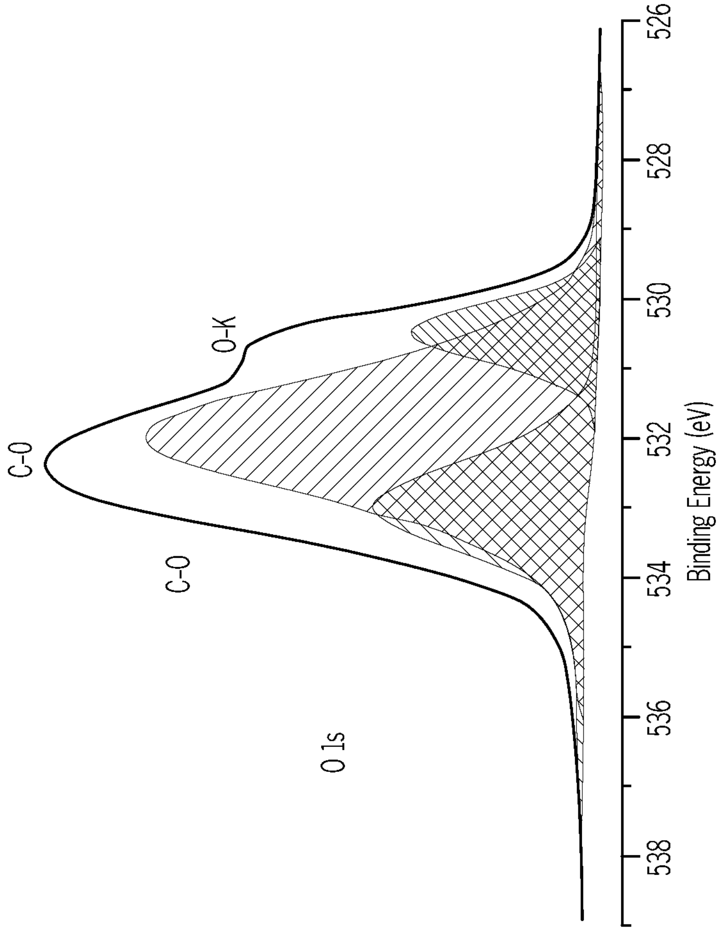
FIG. 3E is a representative XPS spectrum of the TBPS powder in the O 1s region.
Figure 3F:
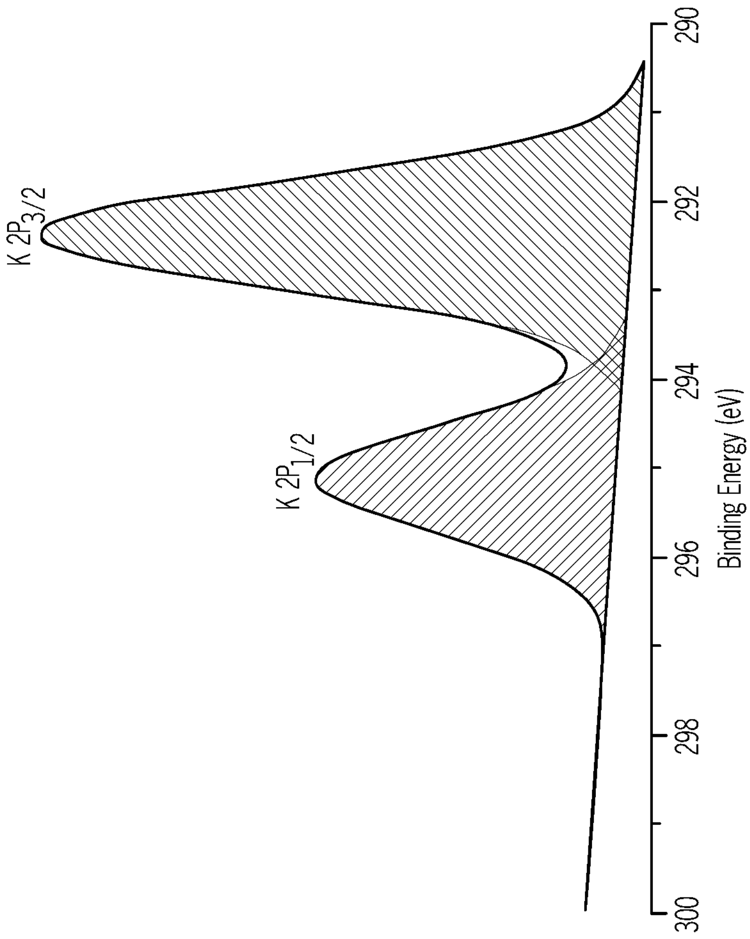
FIG. 3F is a representative XPS spectrum of the TBPS powder in the K 2p region.
Figure 4:
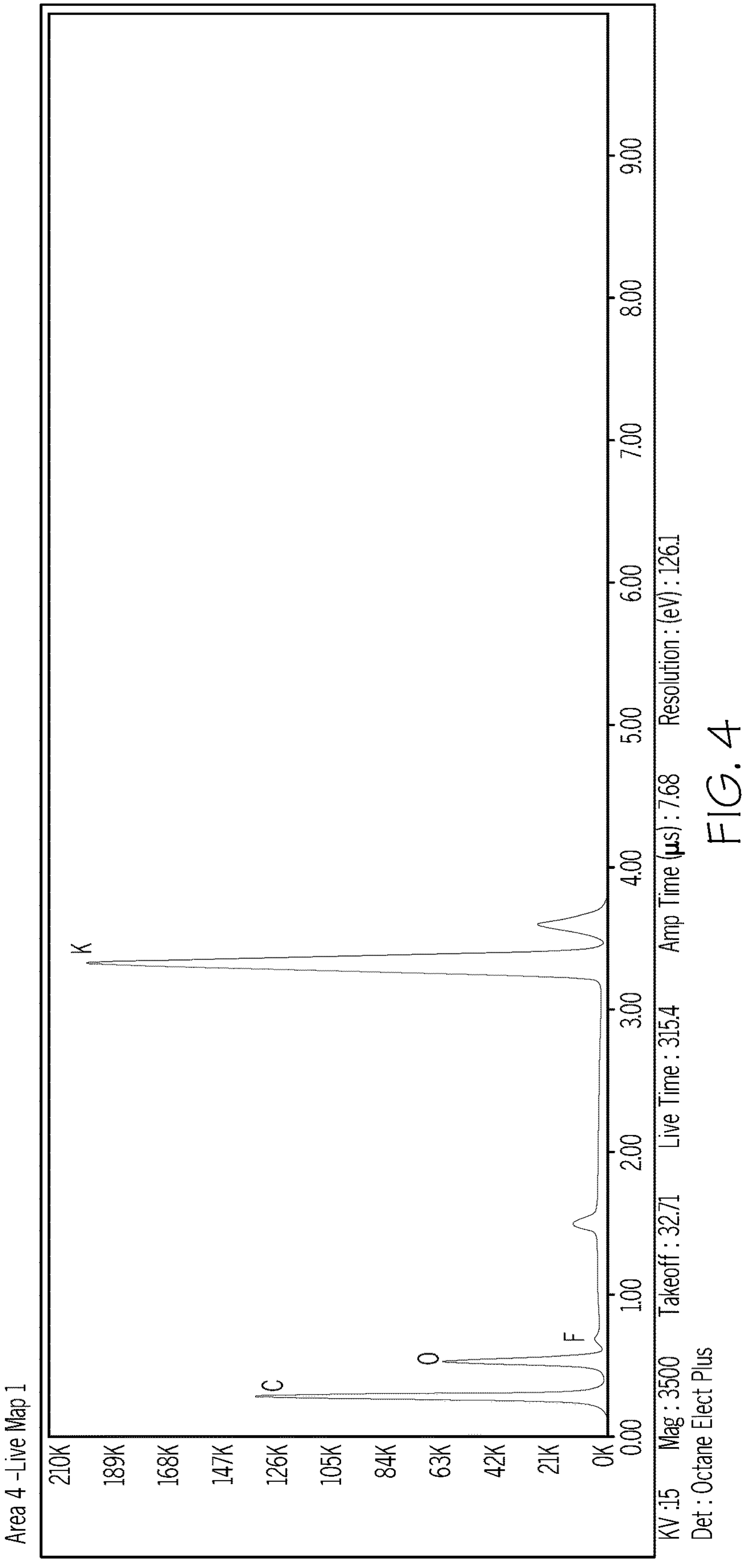
FIG. 4 is a representative plot displaying the EDX elemental data for TBPS powder.

To achieve the all-organic RPB, a carbonyl-based n-type organic anode was coupled with an amine-based p-type organic cathode (polyaniline, PANI). The anode material, tetrahydroxy-1,4-benzoquinone potassium salt (TBPS), was synthesized by neutralizing tetrahydroxy-1,4-benzoquinone with potassium hydroxide in an ethanol solution. The collected TBPS exists as brown powder and turn to black after ball milling with NG. The carbonyl groups in TBPS are redox centers for $K^+$ insertion/extraction, providing a theoretical capacity of 165.43 mAh $g^{-1}$. The design of organic salts is an effective method to suppress the dissolution of organic compounds in the electrolytes due to the formation of ionic bonding and enhanced polarity. To validate the molecular structure of TBPS, the nuclear magnetic resonance (NMR) was employed using $D_2O$ as the solvent (FIG. 2A and FIG. 2B). In $^1H$ NMR, there is no obvious peak except a singlet peak for the solvent ($D_2O$, 4.784 ppm), indicating the complete deprotonation of the tetrahydroxy-1,4-benzoquinone precursor. The $^{13}C$ NMR confirms C atoms in two different chemical environments. The peaks at 176.44 and 173.02 ppm represent C atoms connect to potassium oxide groups and the C atoms in carbonyl groups, respectively. The molecular and crystalline structure of TBPS were further elucidated by X-ray diffraction (XRD), Fourier-transform infrared spectroscopy (FTIR), Raman spectrum, and X-ray photoelectron spectroscopy (XPS). The sharp peaks in the XRD pattern indicate that TBPS shows high crystallinity (FIG. 3A). The intense absorption peaks at 1594 $cm^{-1}$ and 1052 $cm^{-1}$ in the FTIR spectrum represent the stretching vibrations of C═O and C—O groups, respectively (FIG. 3B). The two peaks located at 353.9 and 422.3 $cm^{-1}$ in the Raman spectrum (FIG. 3C) represent the stretching vibration of O—K groups. The Raman peaks at 1450, 1500, and 1550 $cm^{-1}$ represent C═C and C—C stretching of the benzenoid rings, while the peak at 1661.5 $cm^{-1}$ is ascribed to the stretching vibration of C═O groups. In the XPS spectra (FIG. 3D-FIG. 3F), all the peaks were calibrated by the C—C peak in C is spectrum at 284.8 eV. The XPS peaks at 530.4, 532, and 533 eV in 0 is spectrum are assigned to K—O, C═O, and C—O groups in TBPS. The morphological structure of TBPS was measured by scanning electron microscopy (SEM) and transmission electron microscopes (TEM). TBPS powders consist of irregularly shaped and micro-sized particles. The elemental mapping of TBPS, the results of which are shown in Table XX below, indicates that C, O and K are uniformly distributed in the compound (FIG. 4).

TABLE 1

| Element | Weight % | Atomic % |
|---|---|---|
| C K | 30.45 | 47.36 |
| O K | 27.79 | 32.44 |
| F K | 0.49 | 0.48 |
| K | 41.27 | 19.72 |

Figure 5:
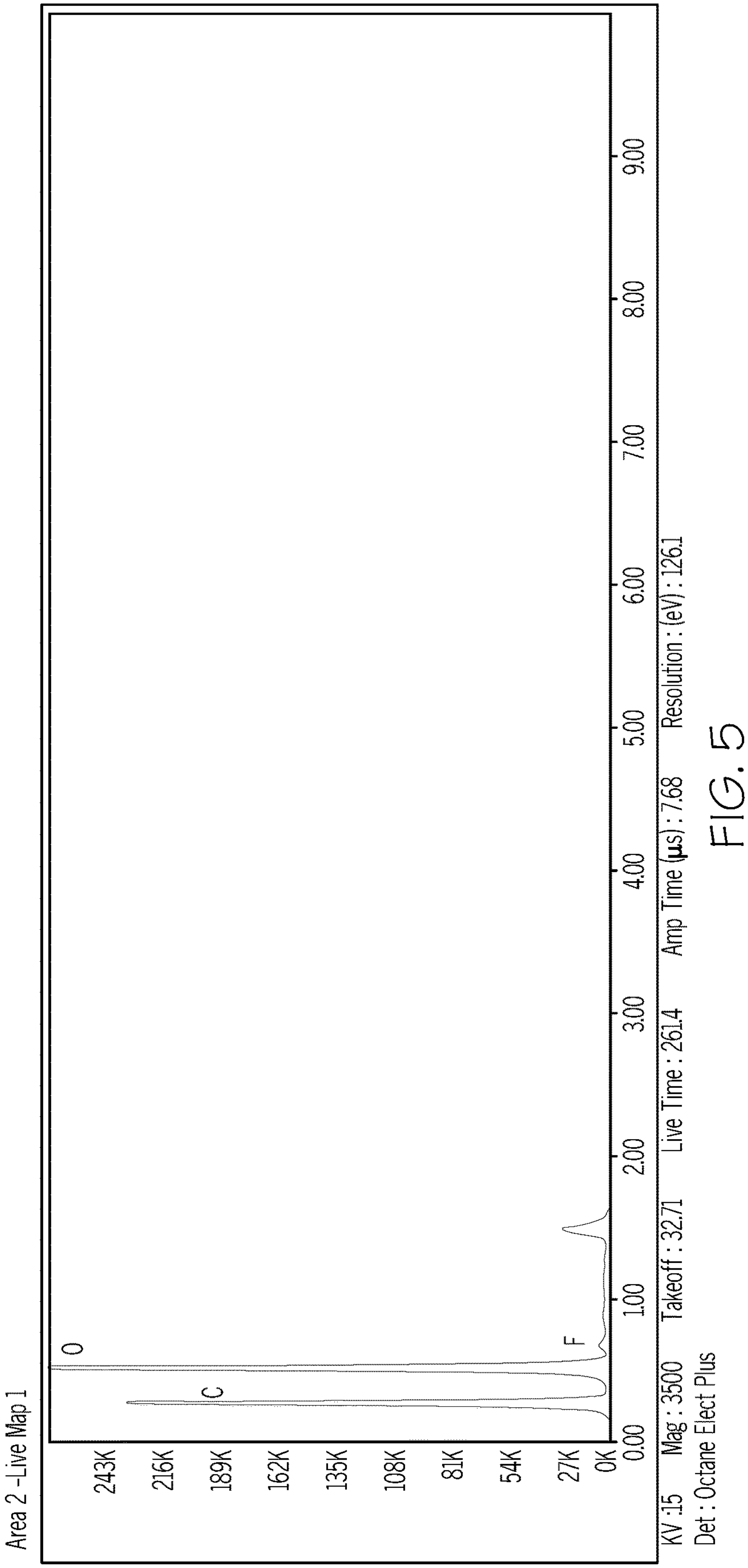
FIG. 5 is a representative plot displaying the EDX elemental data for tetrahydroxy-1,4-benzoquinone hydrate precursor.
Figure 6A:
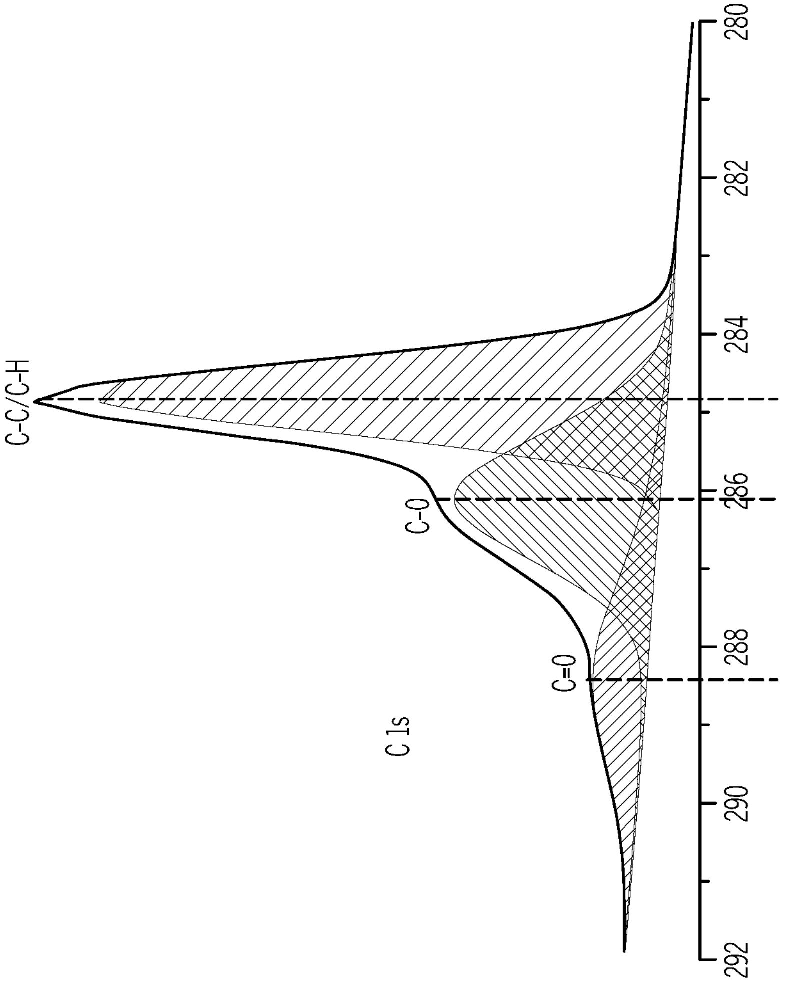
FIG. 6A is a representative XPS spectrum of N-doped graphene in the C 1s region.
Figure 6B:
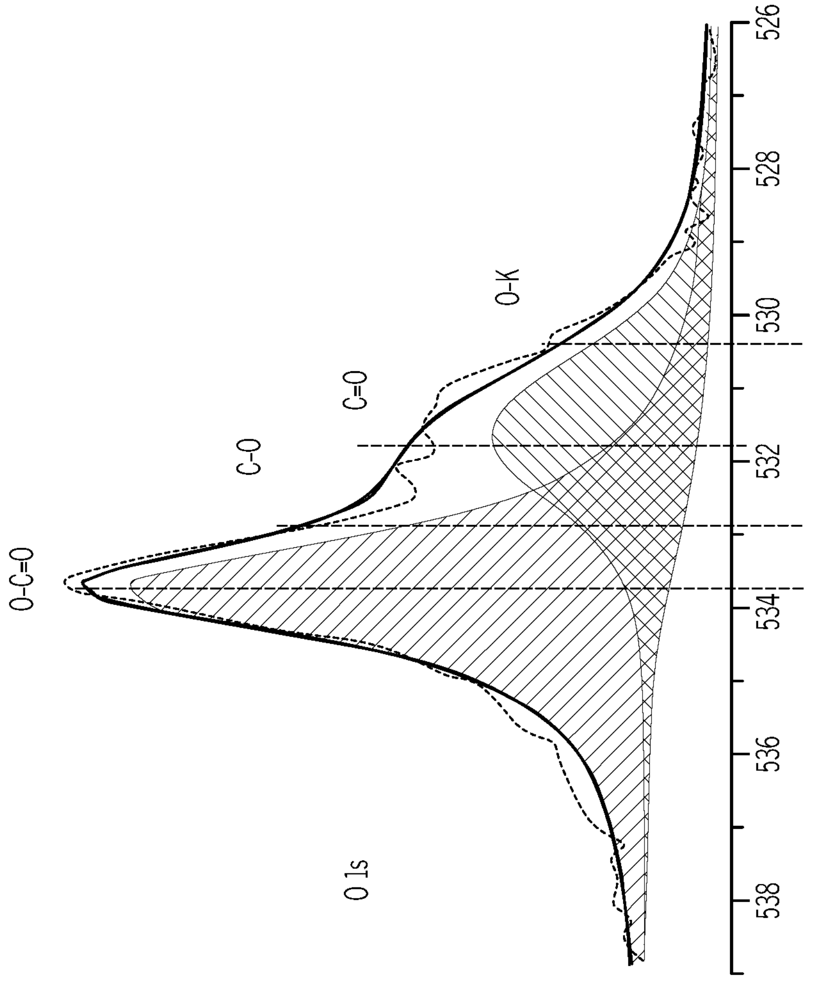
FIG. 6B is a representative XPS spectrum of N-doped graphene in the O 1s region.
Figure 6C:
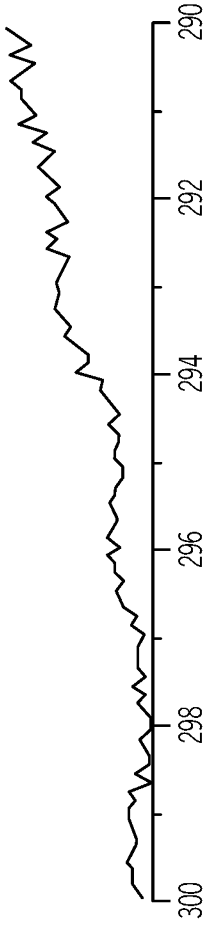
FIG. 6C is a representative XPS spectrum of N-doped graphene in the K 2p region.
Figure 6D:
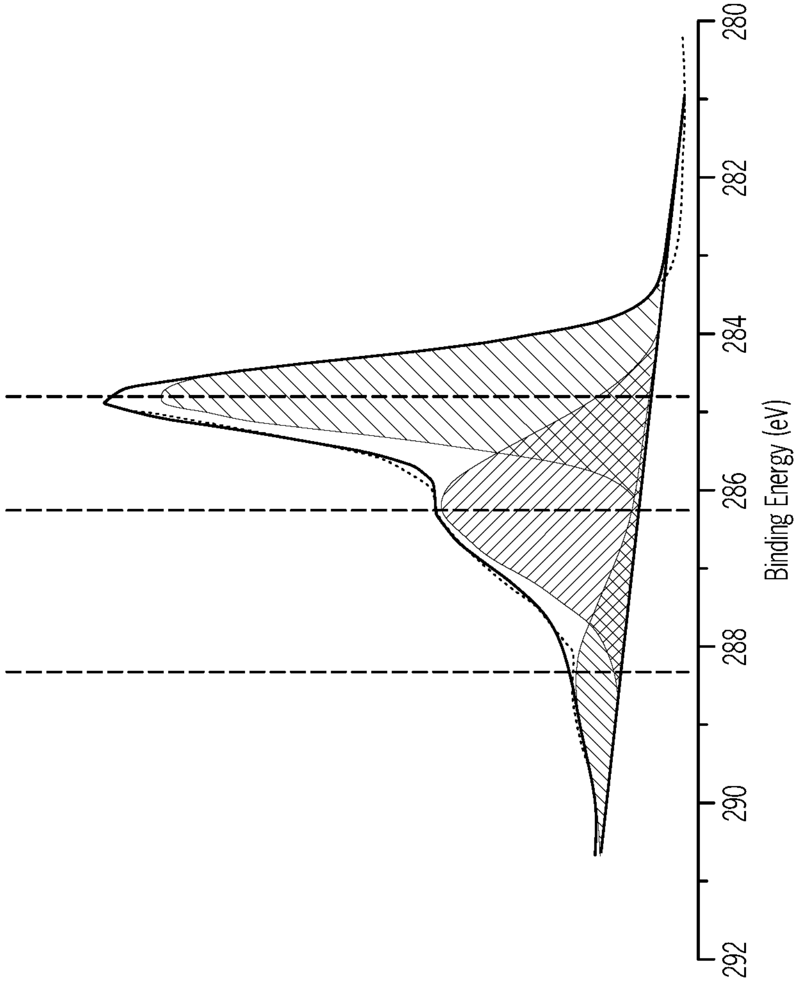
FIG. 6D is a representative XPS spectrum of TBPS/NG powders in the C 1s region.
Figure 6E:
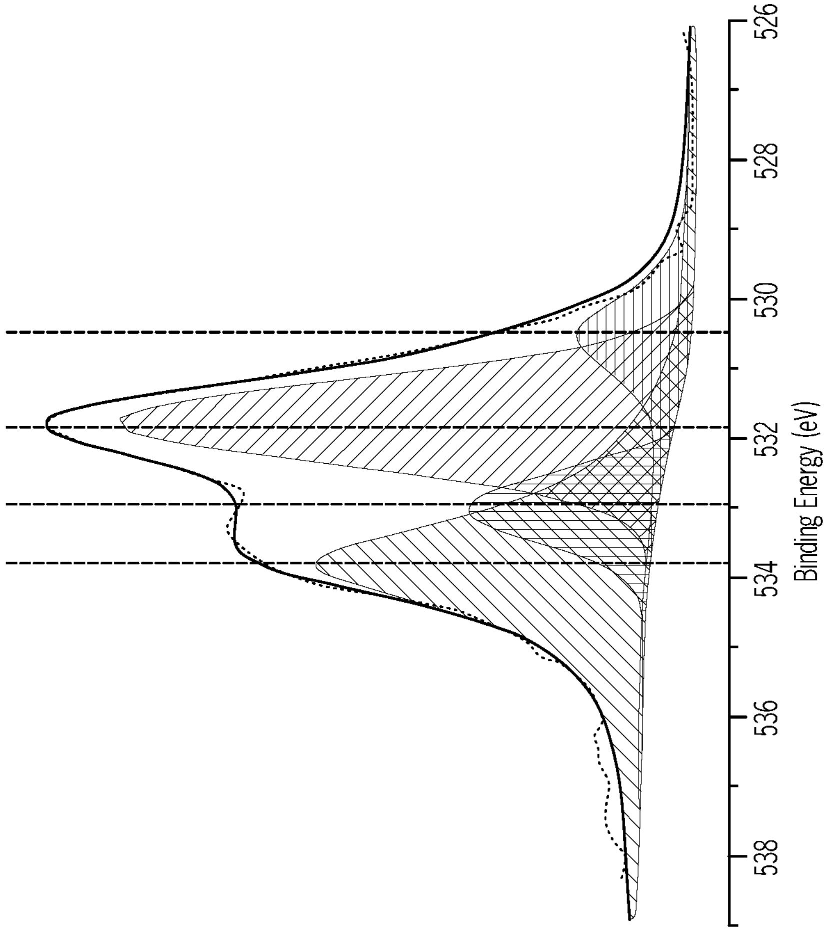
FIG. 6E is a representative XPS spectrum of TBPS/NG powders in the O 1s region.
Figure 6F:
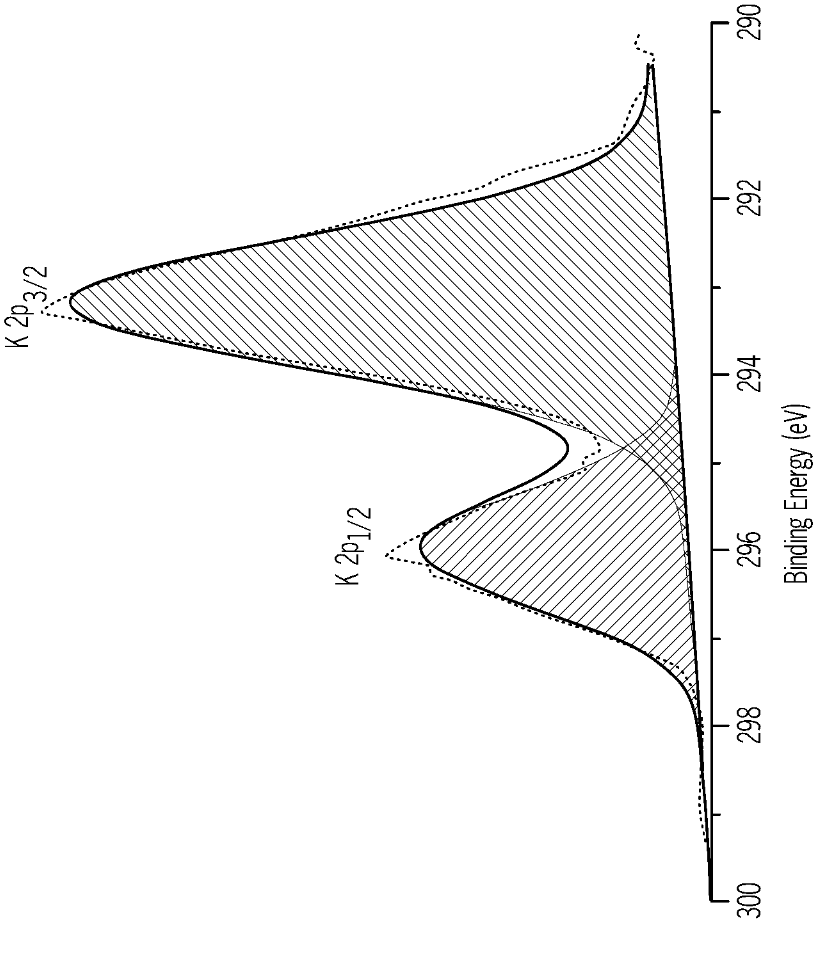
FIG. 6F is a representative XPS spectrum of TBPS/NG powders in the K 2p region.

Meanwhile, the TBPS contains 0.48 at. % F element, which is the impurity from the tetrahydroxy-1,4-benzoquinone hydrate precursor (FIG. 5, Table 2 below).

TABLE 2

| Element | Weight % | Atomic % |
|---|---|---|
| C K | 50.59 | 57.76 |
| O K | 48.67 | 41.71 |
| F K | 0.74 | 0.53 |

To improve the electrochemical performance in RPBs, TBPS was mixed with NG by ball milling. The high conductivity, high stability, and high Young's modulus of NG not only enhance the electronic conductivity but also stabilize the TBPS in RPBs. As shown in FIG. 3A-FIG. 3C and FIG. 6A-FIG. 6F, the crystalline and molecular structure of TBPS is retained in the resulting TBPS/NG composite. SEM and TEM images demonstrate that the micro-sized TBPS particles are fully coated by NG after ball milling. The SEM elemental mapping of TBPS/NG as shown in Table 3 below indicates that the C, N, O and K are uniformly distributed in the composite.

TABLE 3

| Element | Weight % | Atomic % |
|---|---|---|
| C K | 59.49 | 71.61 |
| N K | 0.08 | 0.19 |
| O K | 24.14 | 21.84 |
| F K | 0.80 | 0.61 |
| P K | 0.12 | 0.06 |
| K | 15.37 | 5.69 |

These material characterizations confirm the crystalline, molecular, and morphological structure of the devised organic anode materials, TBPS and TBPS/NG composite.

3. Electrochemical Performance of the TBPS/NG Anode in RPBs

The electrochemical performance of the TBPS/NG anode in RPBs was investigated by coupling it with the K metal as the counter electrode and using 2.8 M KPF6 in DEGDME as the electrolyte. The galvanostatic charge/discharge curves of the TBPS/NG anode at 50 mA $g^{-1}$ showed that the initial Coulombic efficiency (CE) is 46.65% due to the formation of SEI, but it quickly enhances to ~100% after a few cycles.

The TBPS/NG anode exhibits two pairs of redox plateaus centered at ~1.3 V and 0.9 V with a reversible specific capacity of 225.5 mAh $g^{-1}$. The reversible capacity of the TBPS/NG anode is higher than the theoretical capacity of TBPS because of the capacity contribution by NG. NG shows a specific capacity of 74.5 mAh $g^{-1}$ at 50 mA $g^{-1}$ in the cutoff window between 0.5 V and 1.8 V. The TBPS anode without NG delivers a lower reversible capacity but similar redox plateaus as the TBPS/NG anode. In cyclic voltammograms, two cathodic peaks at 1.31/0.86 V and two anodic peaks at 0.89/1.35 V are observed for the TBPS/NG anode, corresponding to the charge/discharge plateaus. This indicates a two-step reaction between two carbonyl groups and two potassium ions. The TBPS/NG anode shows excellent rate capability at room temperature, delivering the specific capacity of 225.5, 218.4, 203.7, 180.4, 157.6, 129.1, 92.7, and 57.8 mAh $g^{-1}$ at the current densities of 50, 100, 200, 500, 1000, 2000, 5000 and 10,000 mA $g^{-1}$. After the current density reduces back to 50 mA $g^{-1}$ the specific capacity recovers to 210.4 mAh $g^{-1}$ immediately, demonstrating robust reaction kinetics. In contrast, the TBPS anode without NG shows moderate rate capability, providing a specific capacity of 160.3 mAh $g^{-1}$ at 50 mA $g^{-1}$ and retaining 31.7 mAh $g^{-1}$ at 10 A $g^{-1}$. In addition to the exceptional rate capability, the TBPS/NG anode also displays superior cyclic stability at room temperature. At the low current density of 100 mA $g^{-1}$, the TBPS/NG anode provides an initial reversible capacity of 175.7 mAh $g^{-1}$ and gradually increases to 230.9 mAh/g after a few cycles. The reversible specific capacity of 192.6 mAh $g^{-1}$ is retained after 500 cycles. At high current densities of 1 A $g^{-1}$ and 5 A $g^{-1}$, the TBPS/NG anode retains reversible capacities of 131.8 mAh $g^{-1}$ after 2,000 cycles and 65.2 mAh $g^{-1}$ after 5,000 cycles, respectively, corresponding to very slow capacity decay rates of 0.0098% and 0.0071% per cycle. On the contrary, the TBPS anode without NG exhibits poor cycling stability at 100 mA $g^{-1}$, 1 A $g^{-1}$ and 5 A $g^{-1}$, demonstrating the importance of NG to the cycle life of the organic anodes. The cyclic stability of the TBPS/NG anode improves with the increased salt concentration in the electrolyte, because the highly concentrated electrolyte effectively mitigates the dissolution of TBPS.

To further investigate the reaction kinetics of the TBPS/NG anode in RPBs, cyclic voltammetry (CV), galvanostatic intermittent titration technique (GITT), and electrochemical impedance spectroscopy (EIS) were employed. The TBPS/NG anode was cycled at various scan rates from 0.1 to 1 mV $s^{-1}$. The anodic peaks shift to a higher potential and the cathodic peaks migrate to a lower potential with the elevated scan rates due to the increased polarization. The liner functions are used to analyze the relationship between the peak current and scan rate. The slope (b) values of anodic and cathodic peaks are 0.7773 and 0.7791, respectively, demonstrating that the reaction kinetics of the TBPS/NG anode is largely contributed by the surface reaction mechanism and exhibits a partial capacitive behavior. In addition, GITT curves at the current density of 20 mA $g^{-1}$ indicate that the charge and discharge overpotentials are only 45 and 66 mV, respectively, further demonstrating fast kinetics of the TBPS/NG anode. The reaction kinetics is also investigated by EIS. The interfacial impedance of the pristine TBPS/NG anode, represented by the depressed semi-circle, is ~10 Ohm and increases to ~26 Ohm after the first cycle due to the formation of the SEI layer. The interfacial impedance gradually decreases to 10 Ohm after 5 cycles and retains a similar value after 50 cycles, indicating the high stability of the SEI layer. The stable and robust SEI layer is critical for the stability of the TBPS/NG anode upon long-term cycling. The electrochemical results validate the outstanding reaction kinetics and high cyclic stability of the TBPS/NG anode in RPBs.

4. Characterization of the TBPS/NG Anode after Cycling

To investigate the structure stability of the TBPS/NG anode, the morphology of the pristine electrode and cycled electrodes at different current densities were characterized. The TBPS/NG in the pristine electrode shows a micro-sized particle structure and the surface is smooth due to the uniform NG coating. After 20 cycles at the current density of 200 mA $g^{-1}$, abundant NG wrinkles are formed on the surface due to the large volume change during the charge/discharge process. The elemental mappings, the results of which are shown in Table 4 below, show that C, N, O, F, P, and K are homogeneously distributed in the anode after 20 cycles, indicating uniform formation of the SEI layer.

TABLE 4

| Element | Weight % | Atomic % |
|---|---|---|
| C K | 31.3 | 46.28 |
| N K | 0.01 | 0.024 |
| O K | 32.53 | 36.28 |
| F K | 1.42 | 1.33 |
| P K | 0.11 | 0.07 |
| K | 34.62 | 15.80 |

With the increased current density, more surface wrinkles can be observed in SEM images, but the TBPS/NG composite retains the structural integrity even at the high current density of 10 A $g^{-1}$, attributing to the high Young's modulus of NG. In contrast, for the TBPS anode without NG, obvious cracks and holes were generated on the micro-sized TBPS particles and the anodes after 20 cycles at 200 mA $g^{-1}$. These results demonstrate that NG can effectively accommodate the large volume changes and retain the structural integrity of the TBPS/NG anode during the repeated charge/discharge processes even at high current densities, endowing the TBPS/NG anode excellent cycling stability.

The surface information and SEI structure of pristine and cycled TBPS/NG anodes were further characterized by XPS. In the pristine TBPS/NG anode, the XPS peaks at 289 eV in the C is spectrum and 534 eV in the O is spectrum are ascribed to C and O signals of carboxylate groups, which come from the sodium alginate binder. The XPS peaks in F is spectrum of the pristine TBPS/NG anode are attributed to the impurities of tetrahydroxy-1,4-benzoquinone hydrate precursor, which is confirmed by the element mapping results of tetrahydroxy-1,4-benzoquinone hydrate precursor and TBPS powder (FIG. 4 and FIG. 5). In the cycled TBPS/NG anode, the peak at 290 eV in the C is XPS spectrum is assigned to —$CO_3^{2-}$, which indicates the presence of $K_2CO_3$ in the SEI layer. In the F is spectrum, XPS peaks at 688 eV and 686 eV are assigned to C—F and P—F, respectively. The XPS peak at 684.3 eV is assigned to K—F, indicating the formation of KF in the SEI layer. In the P 2p spectrum, the XPS peaks at 135 eV and 138 eV are assigned to P—O and P—F, respectively. The XPS results prove that $K_2CO_3$, KF, organic fluorides, and phosphates are the main components in the SEI layer. As further indicated by XPS, the SEI structure in the TBPS/NG anode is retained even after cycling at high current densities of 5 A $g^{-1}$ and 10 A $g^{-1}$, demonstrating that the $K_2CO_3$— and KF-rich SEI is stable and robust under the fast-charging conditions.

5. Electrochemical Performance of all-Organic RPB at Room Temperature

Since the TBPS/NG anode exhibits superior electrochemical performance in RPBs, it was coupled with a p-type organic cathode, PANI, to explore the full cell performance of all-organic batteries. The low-cost, abundant, highly conductive, and thermally stable PANI undergoes an anion-insertion mechanism in rechargeable batteries, providing a high redox potential above 3 V. In this work, PANI is used in the cathode after ball milling with NG to further improve the performance of the cathode. PANI consists of micro-sized particles, and PANI particles are fully coated by NG and retain the micro-sized structure after ball milling. To match the capacity with the TBPS/NG anode for the full cell measurements, the electrochemical performance of the PANI/NG cathode is investigated. The PANI/NG cathode exhibits a pair of redox plateaus at ~3.25 V. At the current density of 100 mA $g^{-1}$, the initial specific capacity of PANI/NG cathode is 55.2 mAh $g^{-1}$, and it gradually increases to 195.4 mAh $g^{-1}$ after a few cycles and retains at 174.2 mAh $g^{-1}$ after 600 cycles, demonstrating high specific capacity and good cycling stability.

The all-organic RPB based on the TBPS/NG anode, PANI/NG cathode, and a 2.8 M $KPF_6$-DEGDME electrolyte was tested with both low anode mass loading of 1.8 mg $cm^{-2}$ and high anode mass loading of 6.5 mg $cm^{-2}$. The full cell capacity is calculated based on the mass of TBPS. The all-organic RPB with low mass loading of 1.8 mg $cm^{-2}$ exhibits superior rate capability, delivering the specific capacity of 188.1, 169.5, 156.1, 138.4, 123.8, 106.7, 83.1, and 64.9 mAh $g^{-1}$ at the current densities of 50, 100, 200, 500, 1000, 2000, 5000 and 10,000 mA $g^{-1}$. The specific capacity retains at 167.4 mAh $g^{-1}$ after the current density reduces back to 50 mA $g^{-1}$. In cyclic voltammograms at 0.1 mV $s^{-1}$, two cathodic peaks at 1.93 V and 0.82 V, and two anodic peaks at 2.6 V and 2.87 V are observed, corresponding to the charge/discharge plateaus. With elevated scan rates, the CV peaks shift away from each other due to the enhanced polarity at high currents. Furthermore, the all-organic RPB delivers excellent cyclic stability and fast charging capability at room temperature. At 1 A $g^{-1}$, the all-organic RPB delivers an initial reversible capacity of 121.3 mAh $g^{-1}$ and retains at 104 mAh $g^{-1}$ after 6,000 cycles, corresponding to a very slow capacity decay rate of 0.0024% per cycle. Even at 5 A $g^{-1}$, the all-organic RPB still delivers an initial specific capacity of 89.3 mAh $g^{-1}$ and retains a reversible capacity of 51.9 mAh $g^{-1}$ after 50,000 cycles, representing the fast kinetics and best cycle life in RPBs. The exceptional electrochemical performance demonstrates that this all-organic RPB is promising for sustainable and fast-charging energy storage. Since the all-organic RPB with low mass loading shows impressive performance, the electrochemical performance of the all-organic RPB was further exploited with high mass loading of 6.5 mg $cm^{-2}$ (based on TBPS). The all-organic RPB with high mass loading retains the outstanding rate capability at room temperature, delivering the specific capacity of 181.5, 168.8, 152.9, 126.8, 100.2 and 65.7 mAh $g^{-1}$ at the current density of 50, 100, 200, 500, 1000 and 2000 mA $g^{-1}$. The specific capacity recovers to 165.1 mAh $g^{-1}$ immediately after the current density reduces back to 50 mA $g^{-1}$. Meanwhile, the all-organic RPB with high mass loading also delivers high cyclic stability and fast-charging capability at room temperature. At 200 mA $g^{-1}$, it provides an initial reversible capacity of 157.7 mAh $g^{-1}$ and remains at 123.2 mAh $g^{-1}$ after 1,000 cycles. At 1 A $g^{-1}$, it delivers an initial specific capacity of 102.6 mAh $g^{-1}$ and provides a capacity retention of 72.8% after 10,000 cycles. The exceptional performance of the high-mass-loading all-organic RPB at room temperature renders it promising for practical applications in the sustainable and fast-charging energy storage field.

6. Electrochemical Performance of the all-Organic RPB at High Temperatures

Since the all-organic RPB exhibits impressive performance at room temperature, its feasibility at high temperatures was further investigated. The cyclic stability of the all-organic RPB with high anode mass loading of 6.5 mg $cm^{-2}$ was assessed at 80° C. The galvanostatic charge/discharge curves at 200 mA $g^{-1}$ show a pair of sloping plateaus centered at 2V with an initial capacity of 131.8 mAh $g^{-1}$. In the long-term cycling test, a reversible capacity of 111.3 mAh $g^{-1}$ is retained after 300 cycles, demonstrating high durability at 80° C. In addition, the all-organic RPB with high mass loading also exhibits superior rate capability at high temperatures from 70100° C. At 70° C., the batteries deliver specific capacities of 173.1, 153.5, 142.1, 128.2, 114.3, and 93.5 mAh $g^{-1}$ at the current densities of 50, 100, 200, 500, 1000 and 2000 mA $g^{-1}$ and remains at 148.2 mAh $g^{-1}$ after the current density reduces back to 50 mA $g^{-1}$. At even higher temperatures, the all-organic RPB still retains the exceptional rate capability that reversible capacities of 81.8, 80.5, 65.1 mAh $g^{-1}$ at high current density of 2 A $g^{-1}$ are achieved at 80° C., 90° C., and 100° C., demonstrating the fast-charging capability at high temperatures. Hence, the cyclic stability of the all-organic RPB at high temperatures is further investigated at the high current density of 1 A $g^{-1}$. The battery provides an initial reversible capacity of 118.8 mAh $g^{-1}$ at 70° C. After 500 cycles, a reversible capacity of 99.9 mAh $g^{-1}$ can still be retained, demonstrating superb cycle life at 70° C. When the temperature increases to 80° C., 90° C., and 100° C., the all-organic RPB exhibits 87.08%, 77.13%, and 66.28% capacity retention for 500 cycles, respectively, demonstrating a stable high-temperature battery. To further evaluate the feasibility for practical applications at high temperatures, the lab-made all-organic RPBs were used to power the red LED lights and a small fan in a high-temperature oven. The all-organic RPBs are placed in an oven, and then the temperature increases from room temperature to 90° C. in 15 min. After the temperature reaches 90° C., the all-organic RPBs are able to power both red LED lights and a small fan in the oven, demonstrating great promise for practical application in the high-temperature energy storage field. Therefore, the cell configuration based on abundant OEMs and potassium resources is promising for developing fast-charging, high-temperature, and sustainable energy storage devices.

7. The Impact of the Concentrated Electrolyte for the all-Organic RPB

To gain fundamental insights into the impressive electrochemical performance of the all-organic RPB, FTIR, Raman spectroscopy, XPS, XRD, and SEM are used to study the electrolyte and SEI structure, as well as the structural evolution of the cycled electrodes at high temperatures. The electrolyte plays an important role in the formation of the stable SEI layer in the fast-charging and high-temperature RPB. To understand the impact of the concentrated electrolyte on the electrochemical performance, FTIR and Raman were employed to investigate the chemical properties of various electrolytes. The P—F bending peak of $KPF_6$ at ~752.3 $cm^{-1}$ undergoes a downshift to 742.2 $cm^{-1}$ when dissolved in the DEGDME solvent, which is smaller than that of $KPF_6$ in the DME solvent (739.5 $cm^{-1}$). This demonstrates a stronger $K^+$ and $PF_6$-interaction in the $KPF_6$-DEGDME electrolytes. With increased $KPF_6$ concentration up to 2.8 M, the free DEGDME (CO—C stretching vibration band at ~850 $cm^{-1}$) shows a more obvious upshift than that in DME-based electrolytes, indicating the strong $K^+$ and DEGDME interaction in the 2.8 M $KPF_6$-DEGDME electrolyte (46-49). In addition, analogous to the Raman results, the FTIR peaks of C—O—C and CH groups in DEGDME at ~1099 $cm^{-1}$ and 843 $cm^{-1}$ show more obvious downshift than that of DME at ~1104 and 844 $cm^{-1}$ with the increased $KPF_6$ concentration, further confirming a more stable $K^+$-coordinated DEGDME structure in the 2.8 M $KPF_6$-DEGDME electrolyte.

To further investigate the thermal stability of the concentrated electrolyte, equivalent amount of 2.8 M $KPF_6$-DEGDME, 1 M $KPF_6$-DEGDME, 1 M $KPF_6$-DME, and 0.8 M $KPF_6$-EC/DEC electrolytes were heated at 100° C. in the air. All of the electrolytes are clear solutions without any precipitation before the heat treatment. After heating for 1 h, 1 M $KPF_6$-DEGDME and 0.8 M $KPF_6$-EC/DEC electrolytes remain clear. However, the 2.8 M $KPF_6$-DEGDME and 1 M $KPF_6$-DME electrolytes show obvious precipitation. For the 2.8 M $KPF_6$-DEGDME electrolyte, the precipitation starts to form after the temperature reaches 100° C. To exclude the reaction between the electrolyte and air, the electrolyte was heated to 100° C. in a closed vial and at the Argon atmosphere, but the precipitation still forms. To verify the structure of the precipitation from the heated 2.8 M $KPF_6$-DEGDME electrolyte, the precipitation was collected and dried in a vacuum oven to remove the DEGDME solvent. Raman and FTIR spectroscopies were used to study the structure of the precipitation. The Raman spectrum of the precipitation is well matched with that of $KPF_6$, while the strong FTIR peak at ~795 $cm^{-1}$ for $KPF_6$ presents in the FTIR spectrum for the precipitation, demonstrating that the precipitation is $KPF_6$. There are a few small peaks in the FTIR spectrum of the precipitation due to the trace amount of DEGDME solvent. Hence, the results demonstrate that the extra $KPF_6$ forms precipitation at 100° C. Moreover, the precipitation can be re-dissolved in DEGDME after the electrolyte cools down to the room temperature. The concentration of 2.8 M $KPF_6$-DEGDME electrolyte is close to saturation at the room temperature, and the solubility of $KPF_6$ in DEGDME decreases with the elevated temperature. Extra $KPF_6$ forms precipitation at 100° C. Since the growth of SEI in initial cycles will consume $KPF_6$, the precipitation can gradually re-dissolve into the electrolyte to offset the consumption of $KPF_6$ and maintain the electrolyte concentration, which is beneficial for the enhancement of cycling stability of the all-organic RPB at high temperatures. In addition, the average CE of the all-organic RPB at 1 A $g^{-1}$ and 80° C. is 99.8% upon long-term cycling, indicating continuous consumption of $KPF_6$. The $KPF_6$ precipitation will compensate for the concentration decrease. Moreover, the 2.8 M $KPF_6$-DEGDME electrolyte with precipitation at 100° C. is still flowable, so it will not compromise the electrochemical performance. In contrast, the volume of 1 M $KPF_6$-DME and 0.8 M $KPF_6$-EC/DEC electrolytes obviously decrease after heating at 100° C. for 3 h due to the evaporation of DME and DEC. After 24 h, 1 M $KPF_6$-DME and 0.8 M $KPF_6$-EC/DEC electrolytes become solid-state, indicating the complete depletion of solvents in these electrolytes. On the contrary, the volume of 2.8 M $KPF_6$-DEGDME and 1 M $KPF_6$-DEGDME electrolytes does not change after heating for 6 h. After 24 h, the volume of 2.8 M $KPF_6$-DEGDME electrolyte is still comparable to that of the pristine electrolyte and higher than that of 1 M $KPF_6$-DEGDME electrolyte, demonstrating the best thermal stability. The excellent thermal stability is attributed to the strong interaction between $K^+$ and DEGDME in the 2.8 M $KPF_6$-DEGDME electrolyte.

8. Characterization of the all-Organic RPB at High Temperatures

In addition to the electrolyte thermal stability, the SEI and electrode structures at high temperatures were also studied. The pristine TBPS/NG anode displays a smooth surface. At 70° C., the TBPS/NG particles retain the micro-sized structure, and the surface is smooth without any cracks. Similar morphologies are also observed at 80° C. and 90° C., demonstrating the stable TBPS/NG composite structure and the formation of the stable SEI layer at high temperatures. At 100° C., the TBPS/NG particles remain as micro-sized structures and do not show obvious cracks, but the surface becomes rough, and small holes are generated, indicating a less stable composite structure and SEI layer at 100° C. It matches with the electrochemical performance at high temperatures that the cycling stability of the all-organic RPB at 100° C. is worse than that at 70-90° C. Moreover, the morphology of the TBPS anode without NG at high temperatures is also measured as a reference. TBPS particles are fully smashed at temperatures above 70° C., and obvious cracks are formed on the surface of the anode due to the large volume change during the potassiation/de-potassiation process at high temperatures.

The crystalline structure change of TBPS in the cycled TBPS/NG anode at different temperatures was investigated by XRD. The sharp peak at 18 degree is ascribed to the PTFE binder, which is overlapped with one of the XRD peaks for TBPS. Compared with the TBPS/NG powder, XRD peaks in the range from 30 to 40 degree are weakened in the pristine TBPS/NG anode but become stronger after cycling at different temperatures. The peak at 37.5 degree disappears after cycling at high temperatures, but the peaks at 24.7, 27.9, 31.8, 34.2 and 36.6 degree remain after cycling at 70-100° C., indicating that the crystalline structure changes after cycling and the newly formed crystalline structure shows high stability at high temperatures. The peaks at 28.89, 30.9, 35.29, and 41.78 degree are assigned to KF, $K_2CO_3$, carbon phosphorus fluoride (C12PF5.5), and potassium oxide, which are the key components of the SEI layer. However, the intensity of these peaks at 100° C. is much lower than that at other temperatures due to the instability of the SEI layer at such a high temperature. This is consistent with the electrochemical performance of the all-organic RPB at high temperatures.

XPS was employed to further investigate the SEI structure at high temperatures. Analogous to the XPS results obtained at room temperature, the pronounced C is peak at 290 eV and F is peak at 684.3 eV are shown after cycling at 200 mA $g^{-1}$ and 70° C. for 20 cycles, demonstrating the presence of $K_2CO_3$ and KF in the SEI layer. These two peaks maintain a high intensity at 80 and 90° C. but are dramatically weakened at 100° C., indicating the reduced $K_2CO_3$ and KF content in the SEI layer at 100° C. In addition, the intensity of F is peaks at 685.8 and 688.2 eV, and P 2p peaks at 134.1 and 138.3 eV is dramatically enhanced at 100° C., demonstrating that the content of organic fluoride and phosphate in the SEI is remarkably increased at 100° C. due to the continuous parasitic reactions at the anode/electrolyte interphase. A thick fluoroorganic layer in the SEI will hinder the electronic and ionic conductivity of the anodes and result in worse electrochemical performance at 100° C. This result further proves that $K_2CO_3$ and KF are key components in the SEI to improve the stability of the TBPS/NG anode at high temperatures.

9. Characterization of the Cycled PANI/NG Cathode at High Temperature

The structure stability of the PANI/NG cathode in the all-organic RPB is also very important for the electrochemical performance, so SEM and XPS was used to study the morphology change and surface structure of the cycled PANI/NG cathode at high temperatures. In the pristine PANI/NG cathode, the surface of PANI/NG particles are smooth and the PANI is fully covered by NG. After cycled at 70° C., the NG on the surface of the particles is wrinkled, and the surface becomes rougher as the temperature rises to 100° C. However, there are no obvious cracks on the surface of cycled PANI/NG particles even at 100° C. The comparison between the morphologies of PANI/NG cathode and TBPS/NG anode after cycling at 100° C. proves that the PANI/NG cathode shows much better structural integrity than that of the TBPS/NG anode, which suggests that the structural deterioration of the TBPS/NG anode is the main reason for the capacity decay of the all-organic RPB at 100° C. To verify this conclusion, XPS was further employed to investigate the cathode electrolyte interphase (CEI) formation at high temperatures. The peak at 531 eV in 0 is XPS spectra is assigned to —$PO4^{3-}$, indicating the existence of phosphate in the CEI layer. The intensity of the —$PO4^{3-}$ peak does not change from 70° C. to 100° C., demonstrating high stability of the CEI layer at high temperatures. The intensity of peaks at 688 and 685 eV in F is XPS spectra dramatically increases at 90° C. and 100° C., revealing the thickness of organic fluorides and KF increases over 90° C. The results demonstrate that the CEI is composed of phosphate, organic fluorides, and KF, which exhibit superior stability even at a high temperature of 100° C.

In summary, this work demonstrates the feasibility of employing abundant and sustainable OEMs and potassium resources to achieve fast-charging and high-temperature batteries. An organic anode material, TBPS, was synthesized to couple with PANI for the all-organic RPB at extreme conditions. NG and a 2.8 M $KPF_6$-DEGDME electrolyte are used to mitigate the dissolution of OEMs, enhance the conductivity of organic electrodes, accommodate the large volume change, generate stable electrode/electrolyte interphases, and thus improving the electrochemical performance of the all-organic RPB, especially under extreme conditions. The TBPS/NG anode delivers excellent electrochemical performance, in terms of high specific capacity (225.5 mAh $g^{-1}$ at 50 mA $g^{-1}$), fast-charging capability (up to 10 A $g^{-1}$), and long cycling stability (5,000 cycles at 5 A $g^{-1}$). After coupling with the PANI/NG cathode, an all-organic RPB exhibits ultralong cycle life of 50,000 cycles at 5 A $g^{-1}$ and room temperature. The all-organic RPB with high mass loading of 6.5 mg $cm^{-2}$ also shows exceptional performance at high temperatures that stable cycle life of 500 cycles at 1 A $g^{-1}$ and 70-100° C. can be achieved. The superior electrochemical performance at both room temperature and high temperature is attributed to the stable organic anode/cathode materials (TBPS and PANI), highly conductive and robust NG, as well as the formation of a $K_2CO_3$— and KF-rich SEI.

Features and advantages of this disclosure are apparent from the detailed specification, and the claims cover all such features and advantages. Numerous variations will occur to those skilled in the art, and any variations equivalent to those described in this disclosure fall within the scope of this disclosure. Those skilled in the art will appreciate that the conception upon which this disclosure is based may be used as a basis for designing other methods and systems for carrying out the several purposes of this disclosure. As a result, the claims should not be considered as limited by the description or examples.

What is claimed is:

1. A battery comprising:

a) a cathode material comprising a p-type organic polymer having the following structure:

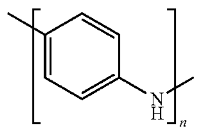

wherein n is an integer greater than one;

b) an anode material comprising an n-type organic compound having the following structure:

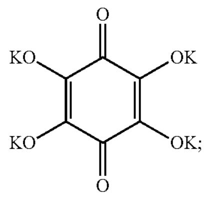

and c) a liquid non-aqueous electrolyte comprising $KPF_6$ in diethylene glycol dimethyl ether (DEGDME), wherein the liquid non-aqueous electrolyte has a boiling point of at least 100° C.

2. The battery of claim 1, wherein the cathode material or anode material further comprises a carbonaceous conductive material.

3. The battery of claim 1, wherein the cathode material and anode material further comprises a carbonaceous conductive material.

4. The battery of claim 2, wherein the carbonaceous conductive material comprises a single-walled carbon nanotube, a multi-walled carbon nanotube, fullerene, graphite, graphene, or graphene oxide.

5. The battery of claim 2, wherein the carbonaceous conductive material comprises nitrogen-doped graphene.

6. The battery of claim 2, wherein the ratio of the p-type organic polymer to the carbonaceous conductive material ranges from 20:1 to 1:1.

7. The battery of claim 2, wherein the ratio of the n-type organic compound to the carbonaceous conductive material ranges from 20:1 to 1:1.

8. The battery of claim 2, wherein the ratio of the p-type organic polymer to the carbonaceous conductive material is about 8:1.

9. The battery of claim 2, wherein the ratio of the n-type organic compound to the carbonaceous conductive material is about 8:1.

10. The battery of claim 1, wherein the cathode material, the anode material, and the liquid non-aqueous electrolyte are free of lithium or a salt thereof.

11. The battery of claim 1, wherein the cathode material, the anode material, and the liquid non-aqueous electrolyte are free of any transition metal.

12. The battery of claim 1, wherein the battery has a capacity at a temperature of at least 60° C. that is at least 50% of the capacity exhibited by the battery at 25° C.

13. The battery of claim 1, wherein the battery has a capacity at a temperature of at least 60° C. that is at least 60% of the capacity exhibited by the battery at 25° C.

14. The battery of claim 1, wherein the battery is capable of completing at least 300 charge/discharge cycles at a temperature of at least 60° C.

* * * * *